United States Patent [19]
Stechly

[11] Patent Number: 5,791,807
[45] Date of Patent: Aug. 11, 1998

[54] SCREEN RETAINING ASSEMBLY

[75] Inventor: Paul Michael Stechly, Mississauga, Canada

[73] Assignee: Applied Electronics Limited, Mississauga, Canada

[21] Appl. No.: 642,461

[22] Filed: May 3, 1996

[30] Foreign Application Priority Data

May 1, 1996 [CA] Canada ................... 2175513

[51] Int. Cl.[6] ................................................. F16B 5/00
[52] U.S. Cl. .................. 403/261; 403/389; 403/408.1; 403/DIG. 10; 52/464; 359/443; 359/460
[58] Field of Search ..................... 403/261, 256, 403/384, 396, 337, DIG. 10, 401, 402, 231, 389, 408.1; 52/282.1, 282.5, 464, 468, 800.1, 800.11, 784.1; 359/443, 453, 456, 457, 460

[56] References Cited

U.S. PATENT DOCUMENTS

| | | | |
|---|---|---|---|
| 905,064 | 11/1908 | Fingal et al. | 52/464 |
| 945,351 | 1/1910 | Voigt | 52/464 |
| 1,506,442 | 8/1924 | O'hara | 52/468 X |
| 4,984,871 | 1/1991 | Martinez | |
| 5,103,339 | 4/1992 | Broome | |
| 5,317,449 | 5/1994 | Furuno et al. | 359/443 |

Primary Examiner—Harry C. Kim
Assistant Examiner—William L. Miller
Attorney, Agent, or Firm—Clifford W. Browning; Woodard, Emhardt, Naughton, Moriarty & McNett

[57] ABSTRACT

A screen retaining assembly for rear-projection screens. The screen retaining assembly includes an outer retainer having a stem from along an edge of which extend a pair of generally oppositely disposed flanges. A pair of generally adjacent backing plates are secured to each other by inner and outer threaded fasteners. The fasteners have a head for engaging one of the backing plates, a threaded shank extending through the backing plates and received in a nut engaging the other of the pair of backing plates. The stem of the outer retainer is securable between the backing plates to retain the adjacent edges of an adjacent pair of rear projection screens between the flanges and outer faces of the backing plates.

12 Claims, 4 Drawing Sheets

| | (d) | (b) | (a) |
|---|---|---|---|
| LUMINANCE (B) (%) | 120 | 88 | 100 |
| REFLECTANCE (R) (%) | 69 | 69 | 100 |
| CONTRAST [ =B/R ] | 174 (136) | 128 (100) | 100 (78) |
| COLOR REPRODUCTION AREA ( U', V' ) | 112 | 105 | 100 |

SCREEN RETAINING ASSEMBLY

FIELD OF THE INVENTION

This invention relates generally to rear projection screen mounting hardware and more particularly to screen retention assemblies for supporting the vertical edges of a pair of adjacent rear projection screen panels disposed at an angle to each other.

BACKGROUND

Rear projection screen assemblies generally comprise a plurality of adjacent rear projection screens mounted to a support structure which also supports a projector associated with each screen. The overall picture presented on the rear projection screen assembly comprises a plurality of separate images projected on each individual screen.

Although the screens can be generally coplanar, in larger assemblies it is preferable to angle horizontally adjacent screens to create a curved overall arrangement thereby enhancing the visibility of the outer screens to a centrally disposed viewer.

Figure 1:
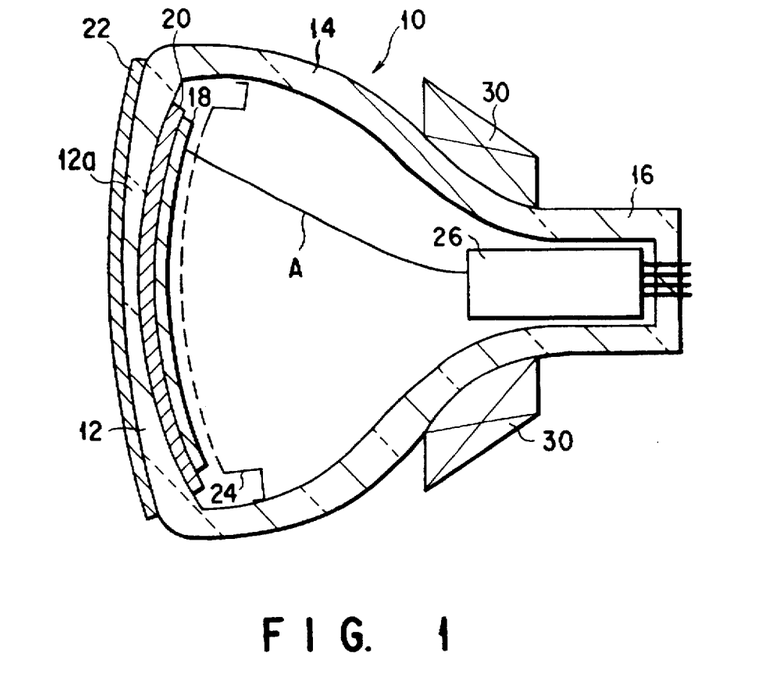
FIG. 1 is a perspective view of a section of a prior art screen retaining assembly.

FIG. 1 is a perspective view generally illustrating at reference 10 a prior art screen retaining assembly or "mullion" for supporting the adjacent vertical edges 12 of a pair of horizontally adjacent rear projection screen panels (hereinafter "panels") 14. The prior art screen retaining assembly 10 comprises an inner member 16 secured to a first supporting member 18 which is in turn supported by a support structure 20 to which projectors (not illustrated) are also mounted. The inner member has a pair of abutment flanges 22 extending from an outer face 24 in opposite directions and generally at right angles thereto.

A generally rectangular outer member 26 is secured by means of fasteners 28 to the outer face 24 of the inner member 16. The outer member 26 is generally parallel to the flanges 22 and an edge 12 of each panel 14 is interspersed between each of said flanges 22 and the outer member 26. A resilient gasket 30 is interspersed between the outer member 26 and the panel 14 and between the flanges 22 and the panel 14.

Although the prior art arrangement is reasonably satisfactory from a structural standpoint for mounting generally coplanar panels 14, it suffers from the fact that the resilient gasket 30 increases its overall breadth thereby presenting a significant gap between images presented on the adjacent panels 14. Although one might be tempted to eliminate the resilient gasket 30, this is not practical, particularly in curved screen arrangements where the resiliency of the gasket 30 is relied upon to enable adjacent panels 12 to be mounted at an angle to each other.

Figure 2:
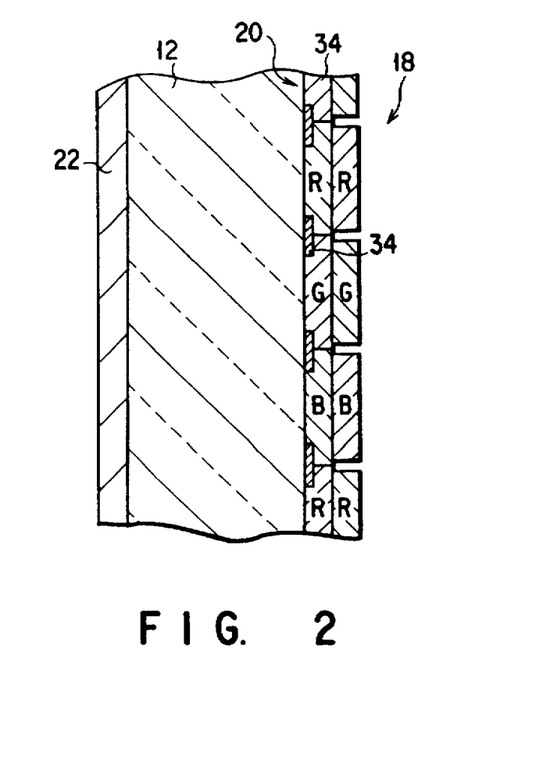
FIG. 2 is an end view of a section corresponding to FIG. 1 but showing an angled screen installation.

FIG. 2 is a sectional view illustrating a prior art mullion in a curved screen arrangement. Even despite the resiliency of the gasket 30, as can be seen from FIG. 2, the prior art screen retaining assembly does not provide an optimum amount of support in such angled configurations. The angle of the right hand screen in FIG. 2 results in the retainer engaging the edge of the panel 14 over a very narrow portion of the available bearing surface. Furthermore, the angle of the right hand panel 14 results in the outer member 26 being further from the inner member 16 than would be the case if both of the panels 14 were coplanar. Accordingly, the edge 12 of the left hand panel 14 is not as securely clamped as it should be as shown by the gap 15. Increasing the angle between the adjacent panels 14 would magnify the shortcomings of the prior art screen retaining assembly 10.

An object of the present invention is to provide a screen retaining assembly for securely supporting adjacent vertical edges of angled adjacent panels while minimizing the breadth of the gap between the images presented on the adjacent panels.

A further object of the present invention is to provide a screen retaining assembly which securely supports adjacent vertical edges of a pair of adjacent panels mounted in an angled configuration.

A still further object of the present invention is to provide a screen retaining assembly which is easily modified to suit panel installations having different angular requirements.

SUMMARY OF THE INVENTION

A rear projection screen panel retaining assembly comprising:

- an outer retainer having a stem and a pair of generally oppositely disposed flanges extending outwardly along an edge of said stem;
- a pair of generally adjacent backing plates, said backing plates being secured to each other by inner and outer threaded fasteners, each said fastener having a head for engaging one of said backing plates and a threaded shank extending through said backing plates and received in a nut engaging the other of said pair of backing plates; and
- said stem of said outer retainer being securable between said backing plates to retain adjacent edges of an adjacent pair of rear projection screen panels between corresponding of said flanges and a respective outer face of each said backing plates.

DESCRIPTION OF DRAWINGS

Preferred embodiments of the present invention are described in detail below with reference to the accompanying drawings in which.

DESCRIPTION OF PREFERRED EMBODIMENTS

A screen retaining assembly according to the present invention is generally illustrated by reference 40 in FIGS. 3 and 4. The screen retaining assembly 40 has an outer retainer 42 of generally "T" shaped cross-section which is illustrated in more detail in FIG. 5. The outer retainer 42 has a stem 44 and a pair of generally oppositely disposed flanges 46 extending outwardly along an edge 48 of the stem 44. In use, the flanges 46 extend along the edges 12 of panels 14.

A pair of generally adjacent backing plates 50 are disposed on either side of the stem 44 of the outer retainer 42 below the flanges 46. The backing plates have outer faces 52 facing the flanges 46. The backing plates 50 would typically be made from elongate strips of a suitable material such as aluminum sheet or plate of appropriate thickness. It is expected that ⅛" thickness will suffice for most installations.

Figure 4:
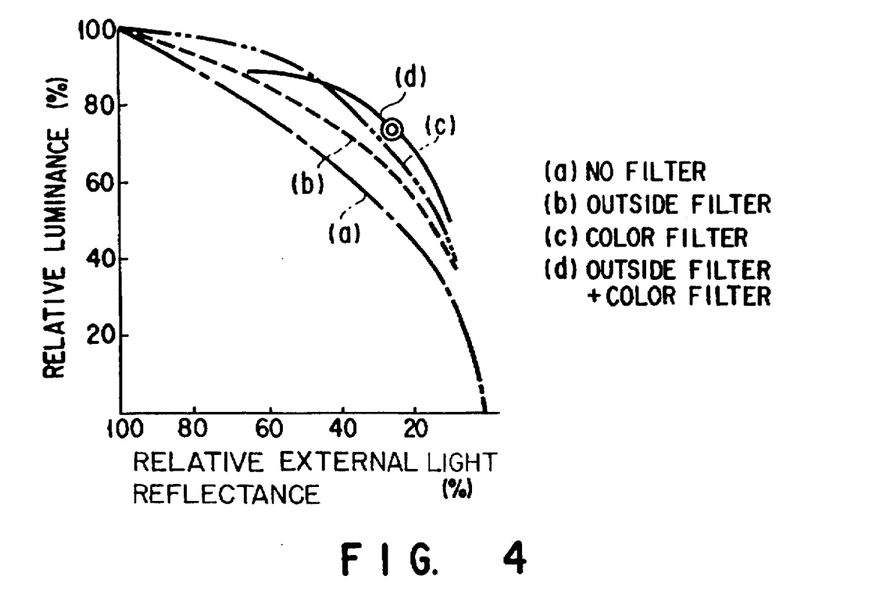
FIG. 4 is a cross-sectional view through a screen retaining assembly according to the present invention in use in a planar installation.

In use in a planar (i.e. non-angled) installation such as illustrated in FIG. 4, a panel 14 is placed with its edge 12 over the outer face 52 and the stem 44 of the outer retainer is inserted between the edges 12 of the panels 14 and the opposed backing plates 50. Threaded fasteners 54 are inserted through suitable apertures through the backing plates 50 and stem 44 of the outer retainer 42 to secure the stem 44 of the outer retainer 42 between the backing plates 50. In this manner the adjacent edges 12 of the adjacent panels 14 are retained between corresponding of the flanges 46 and the outer faces 52 of the backing plates 50.

Figure 5:
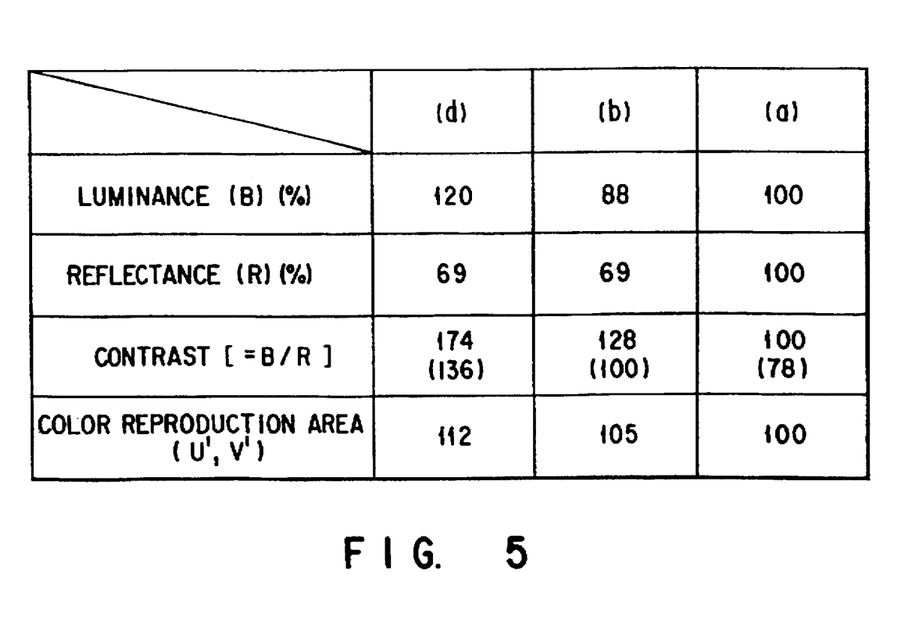
FIG. 5 is a perspective view of an outer retainer according to the present invention.

As illustrated in FIGS. 4 and 5, the outer retainer 42 may be provided with outwardly extending gripping ridges 56 extending from opposite sides of the stem 44 to aid in frictionally securing the outer retainer between the backing plates 50. Although holes could be provided through the outer retainer 40 to receive the threaded fasteners 54, it is preferable to provide open-ended slots such as slot 56 extending into an edge 58 of the stem 44 opposite the flanges 46. Use of a slot 56 enables the backing plates 50 to be loosely joined by the fasteners 54 with the stem 44 of the outer retainer 42 inserted subsequently between the backing plates 50. This avoids having to align all of the components to enable the fasteners 54 to be inserted.

The fasteners 54 would either be tightened subsequently or suitable spacers could be provided between the backing plates 50 over the fasteners 54 to maintain the backing plates 50 at a pre-determined gap for frictionally engaging the stem 44 of the outer retainer 42. A suitable spacer may be of the tubular type illustrated in FIG. 7 as reference 60.

Figure 3:
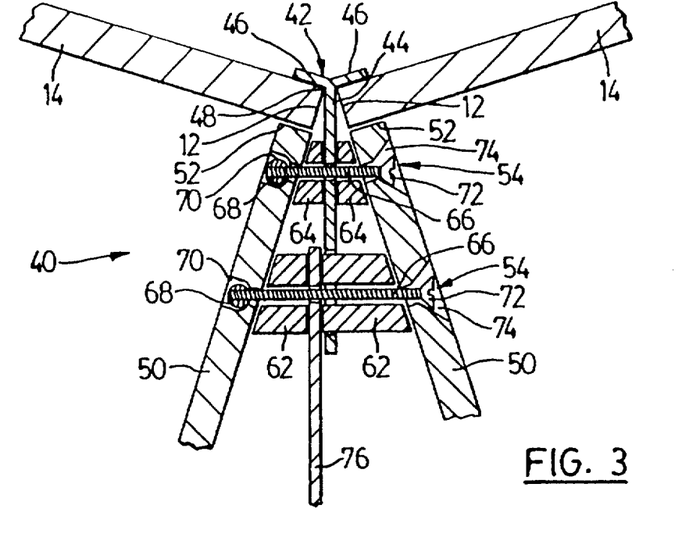
FIG. 3 is a cross-sectional view through a screen retaining assembly according to the present invention in use in an angled installation.
Figures 3A, 3B, 3C:
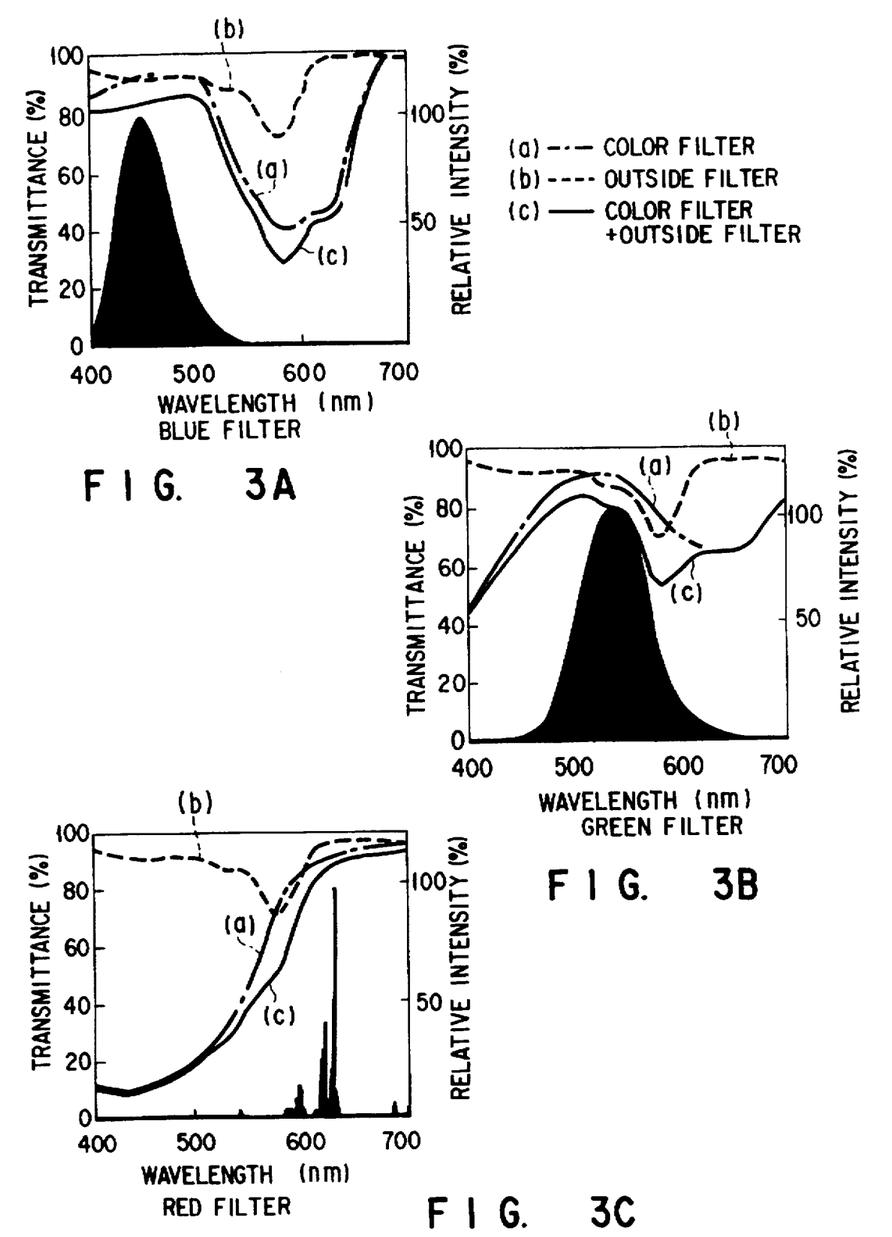

FIG. 3 illustrates the screen retaining assembly 40 used to mount panels 14 in an angled arrangement. In this configuration, beveled spacers 62 and 64 are mounted over shanks 66 of the threaded fasteners 54 with the beveled spacers 64 shown adjacent the panels 14. Spherical swivel nuts 68 are used in correspondingly shaped recesses 70 in the left hand backing plate 50 to enable the backing plates 50 to be secured at various angles without applying a twisting force to the nuts 68 upon tightening. The fasteners 54 have respective heads 72 which may be beveled as shown to nest in beveled recesses 74 in the right backing plate 50. The beveled recess 74 may be made slightly oversize as illustrated to allow some tilting of the heads 72 of the fasteners 54.

The beveled spacers may be mounted on either side of the stem 44 of the outer retainer 40 as shown by spacers 64. Alternatively, a slot such as slot 56 may be provided in the stem 44 of the outer retainer 42 to enable the outer retainer 42 to be slid over one of the sets of spacers such as shown with regard to the beveled spacers 62. In narrower angled installations, only spacers 62 need be used as the inner edges of the outer faces 52 of the outer retainer 42 may abut directly on the stem 44.

The screen retaining assembly 40 may be secured to a support framework by a connecting member 76 shown in FIG. 3 as secured between the beveled spacers 62 by the fastener 54.

Figure 6:
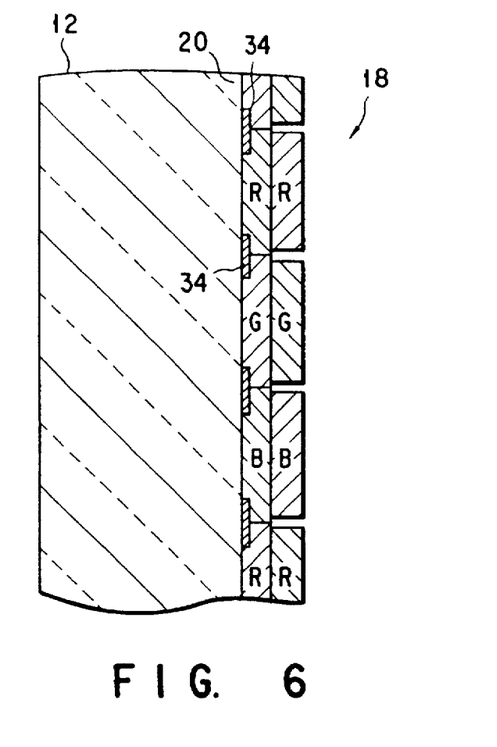
FIG. 6 is a perspective view of a roller assembly for shaping an outer retainer according to the present invention.

In order for the flanges 46 of the outer retainer 42 to lie flat against the outer face of the panels 14, it is necessary for the flanges to be angled to correspond to the angling of the panels 14. This may be achieved by manufacturing the outer retainer 42 from a resilient material that will enable the flanges 44 to be deflected a suitable amount by the panels 14. Alternatively the outer retainer 42 may be manufactured in a right-angled or "T" shaped configuration from a suitably malleable material, such as for example by extruding it from aluminum, and subsequently bent to the correct angle. FIG. 6 illustrates suitable forming rollers for achieving desired angles on the flanges 46 of an outer retainer 42. The rollers include opposed grip rollers 80 for gripping the stem 44 of the outer retainer below the gripping ridges 56 and guiding the outer retainer 42 along between forming rollers 82 and 84. Forming rollers 82 engage the flanges 46 from below and forming roller 84 presses the outer retainer 42 from above between the flanges 46 toward the forming rollers 82.

As a further alternative the outer retainer 42 may be initially formed to have a desired angle between the flanges 46 however because of tooling costs this may not be a desirable alternative unless significant lengths are to be made.

A common problem with mounting rear projection screen panels such as panels 14 illustrated is that the edges 12 may not be perfectly straight or square. The panels 14 may be slightly trapezoidal and the edges 12 may curve slightly. In the prior art structure edge imperfections are accommodated by allowing sufficient breadth in the flanges 22 and outer member 26. This has the disadvantage of presenting a broader gap between adjacent panels 14 than is necessary to retain the panel but for the imperfect edges 12.

Figure 7:
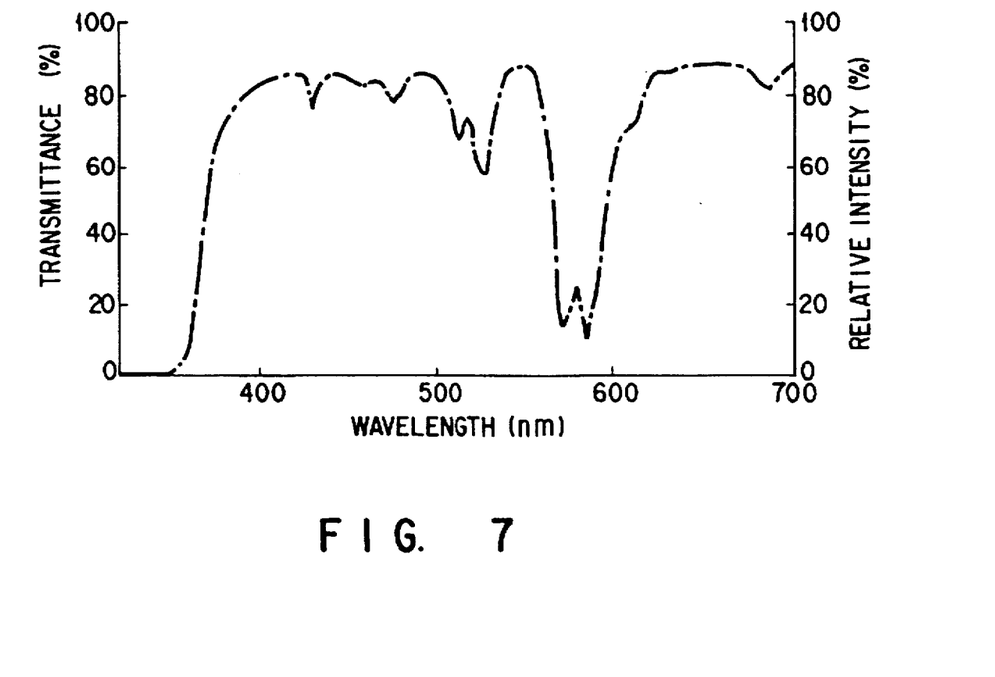
FIG. 7 is a cross-sectional view through a screen retaining assembly according to the present invention showing an alternate embodiment outer retainer.

In the present invention, as the outer retainer 42 extends between the panels 14, it is possible to divide the stem 42 longitudinally between the flanges 44 and bias the flanges 44 away from each other toward the edges 12 of panels 14. Such an arrangement is illustrated in FIGS. 7, 8 and 9 and described in more detail below.

Figures 7, 8:
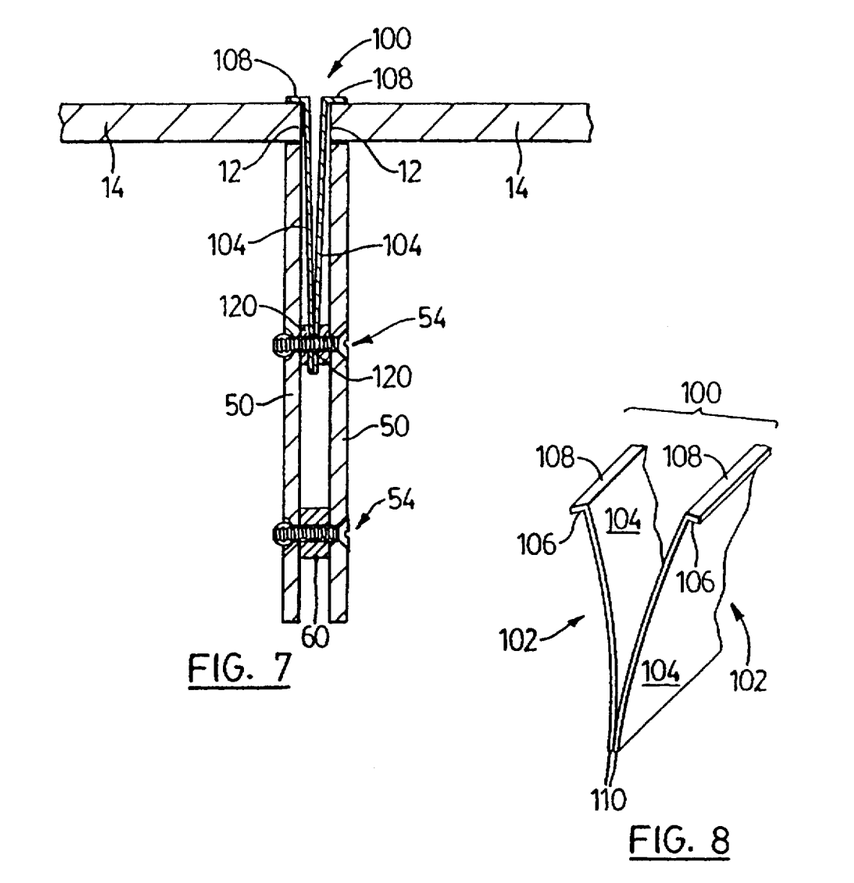
FIG. 8 is a perspective view of an end of the alternate outer retainer of FIG. 7.
Figure 9:
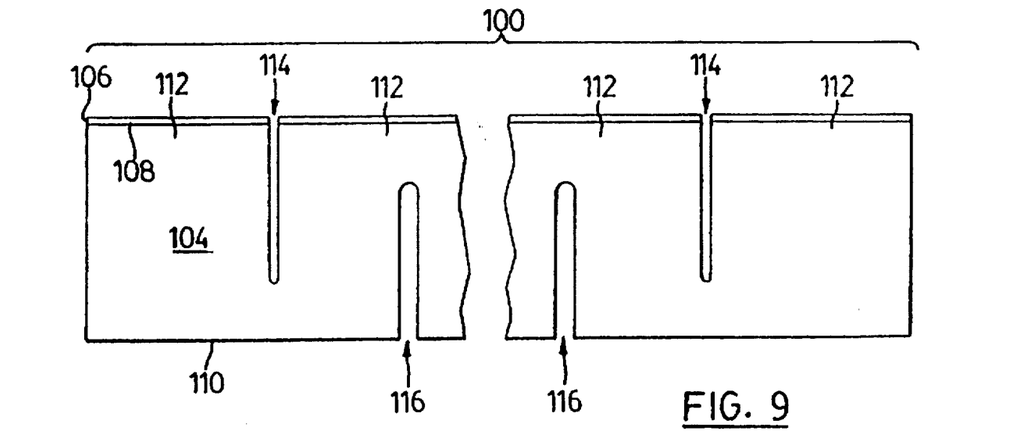
FIG. 9 is a front elevation of one member of the alternate embodiment outer retainer of FIG. 7.

An alternate embodiment outer retainer is generally indicated by reference 100 in FIGS. 8 and 9. The outer retainer 100 is made up of two generally inverted "L" shaped members 102. Each of the members 102 has a stem 104 along an outer edge 106 of which runs a flange 108 extending outwardly from one of the side faces of the stem 102. The stems 104 are joined along inner edges 110 distal the outer edges 106. The joinder may be by any suitable means such as riveting, spot welding, adhesives or, as illustrated in FIG. 7, by fasteners 54 extending through the backing plates 50 and the members 102.

The members 102 should be of a resilient material and shaped so that upon joinder of the stems 104 at inner edges 110 the stems diverge toward the flanges 108 to urge or bias the flanges 108 apart from each other. Preferably, as illustrated in FIG. 9, the outer retainer 100 is divided into sections 112 by slots 114 traversing the flanges 108 and extending inwardly from the edge 106 across a substantial portion of the members 104 preferably at least half-way. Further slots 116 analogous to slots 56 in the FIG. 5 embodiment may be provided extending inwardly from the inner edge 110 for mounting the outer retainer 100 over the fasteners 54.

In use, the sectioning by slots 114 and resilient biasing of the flanges 108 enables each section 112 to move to follow changes in the contours of the edges 12. This enables the flanges 108 to be made only broad enough to adequately engage the panels 14 without requiring substantial further breadth to allow for edge imperfections.

In order to accommodate the above movement of the members 104, the backing plates 50 should be spaced apart somewhat. One way of achieving a suitable degree of spacing is through the use of tubular spacers over the fasteners 54 between the backing plates 50. Reference 60 indicates a spacer between the backing plates 50. References 120 indicate a spacer between each member 104 of the outer retainer 110 and the adjacent backing plate 50.

The above description is intended in an illustrative rather than a restrictive sense. Variations may be apparent to appropriately skilled persons while staying within the spirit and scope of the present invention as defined by the accompanying claims.

I claim:

1. A screen retaining assembly comprising:

an outer retainer having a stem and a pair of generally oppositely disposed flanges extending outwardly along an edge of said stem;

a pair of generally adjacent backing plates, said backing plates being secured to each other by innermost and outermost threaded fasteners, each said fastener having a head for engaging one of said backing plates and a threaded shank extending through said backing plates and received in a nut engaging the other of said pair of backing plates; said outermost of said threaded fasteners being proximal respective outer faces of said backing plates and said innermost of said threadable fasteners being distal said respective outer faces; and said stem of said outer retainer being securable between said backing plates, said assembly having means for retaining adjacent edges of an adjacent pair of rear projection screen panels between said flanges and said respective outer faces of said backing plates.

2. A screen retaining assembly as claimed in claim 1 wherein:

said nuts receiving said fasteners are swivel nuts;

said backing plates are provided with recesses for accommodating said swivel nuts and said heads of said threaded fasteners; and, a beveled spacer is mounted over the shank of at least said innermost threaded fastener to maintain said backing plates spaced apart in a fixed angular relationship.

3. A screen retaining assembly as claimed in claim 1 wherein:

said outer retainer is made up of two members, each member having a stem along an outer edge of which runs one of said pair of flanges;

said stems are joined along an inner edge distal said outer edge;

said members are of a resilient material;

said stems diverge from each other toward said flanges to resiliently bias said flanges away from each other; and said backing plates are spaced apart by spacers mounted over said fasteners to allow movement of said flanges toward and away from each other.

4. A screen retaining assembly as claimed in claim 2 wherein: said outer retainer is made up of two members, each member having a stem along an outer edge of which runs one of said pair of flanges;

said stems are joined along an inner edge distal said outer edge;

said members are of a resilient material;

said stems diverge from each other toward said flanges to resiliently bias said flanges away from each other; and said backing plates are spaced apart by spacers mounted over said fasteners to allow movement of said flanges toward and away from each other.

5. A screen retaining assembly as claimed in claim 3 wherein said outer retainer is divided into sections by slots traversing said flanges and extending from said outer edges across a substantial portion of the members.

6. A screen retaining assembly as claimed in claim 4 wherein said outer retainer is divided into sections by slots traversing said flanges and extending from said outer edges across a substantial portion of the members.

7. A screen retaining assembly as claimed in claim 1 wherein said outer retainer has slots extending from an inner edge to allow said retainer to be mounted over at least said outermost threaded fastener subsequent to said threaded fasteners being inserted through said backing plates.

8. A screen retaining assembly as claimed in claim 2 wherein said outer retainer has slots extending from an inner edge to allow said retainer to be mounted over at least said outermost threaded fastener subsequent to said threaded fasteners being inserted through said backing plates.

9. A screen retaining assembly as claimed in claim 3 wherein said outer retainer has slots extending from said inner edge to allow said retainer to be mounted over at least said outermost threaded fastener subsequent to said threaded fasteners being inserted through said backing plates.

10. A screen retaining assembly as claimed in claim 4 wherein said outer retainer has slots extending from said inner edge to allow said retainer to be mounted over at least said outermost threaded fastener subsequent to said threaded fasteners being inserted through said backing plates.

11. A screen retaining assembly as claimed in claim 5 wherein said outer retainer has slots extending from said inner edge to allow said retainer to be mounted over at least said outermost threaded fastener subsequent to said threaded fasteners being inserted through said backing plates.

12. A screen retaining assembly as claimed in claim 6 wherein said outer retainer has slots extending from said inner edge to allow said retainer to be mounted over at least said outermost threaded fastener subsequent to said threaded fasteners being inserted through said backing plates.

* * * * *

UNITED STATES PATENT AND TRADEMARK OFFICE
CERTIFICATE OF CORRECTION

PATENT NO. : 5,791,807
DATED : August 11, 1998
INVENTOR(S) : Stechly

It is certified that error appears in the above-identified patent and that said Letters Patent is hereby corrected as shown below:

The Title page should be deleted to appear as attached Title page.

Delete drawings sheets 1 of 4 through 4 of 4 and substitute drawing sheets as per attached.

Signed and Sealed this

Ninth Day of March, 1999

Attest:

Attesting Officer

Q. TODD DICKINSON

Acting Commissioner of Patents and Trademarks

United States Patent [19]

Stechly

[11] Patent Number: 5,791,807

[45] Date of Patent: Aug. 11, 1998

[54] SCREEN RETAINING ASSEMBLY

[75] Inventor: Paul Michael Stechly, Mississauga, Canada

[73] Assignee: Applied Electronics Limited, Mississauga, Canada

[21] Appl. No.: 642,461

[22] Filed: May 3, 1996

[30] Foreign Application Priority Data

May 1, 1996 [CA] Canada ................... 2175513

[51] Int. Cl.[6] .............................................. F16B 5/00
[52] U.S. Cl. ................... 403/261; 403/389; 403/408.1; 403/DIG. 10; 52/464; 359/443; 359/460
[58] Field of Search .................. 403/261, 256, 403/384, 396, 337, DIG. 10, 401, 402, 231, 389, 408.1; 52/282.1, 282.5, 464, 468, 800.1, 800.11, 784.1; 359/443, 453, 456, 457, 460

[56] References Cited

U.S. PATENT DOCUMENTS

| | | | |
|---|---|---|---|
| 905,064 | 11/1908 | Fingal et al. | 52/464 |
| 945,351 | 1/1910 | Voigt | 52/464 |
| 1,506,442 | 8/1924 | O'hara | 52/468 X |
| 4,984,871 | 1/1991 | Martinez . | |
| 5,103,339 | 4/1992 | Broome . | |
| 5,317,449 | 5/1994 | Furuno et al. | 359/443 |

*Primary Examiner*—Harry C. Kim
*Assistant Examiner*—William L. Miller
*Attorney, Agent, or Firm*—Clifford W. Browning; Woodard, Emhardt, Naughton, Moriarty & McNett

[57] ABSTRACT

A screen retaining assembly for rear-projection screens. The screen retaining assembly includes an outer retainer having a stem from along an edge of which extend a pair of generally oppositely disposed flanges. A pair of generally adjacent backing plates are secured to each other by inner and outer threaded fasteners. The fasteners have a head for engaging one of the backing plates, a threaded shank extending through the backing plates and received in a nut engaging the other of the pair of backing plates. The stem of the outer retainer is securable between the backing plates to retain the adjacent edges of an adjacent pair of rear projection screens between the flanges and outer faces of the backing plates.

12 Claims, 4 Drawing Sheets